(12) United States Patent
Hiraoka et al.

(10) Patent No.: US 9,210,921 B2
(45) Date of Patent: Dec. 15, 2015

(54) LINE CLIP AND A SPOOL OF A SPINNING REEL TO WHICH THE LINE CLIP IS MOUNTED

(71) Applicant: Shimano Inc., Sakai, Osaka (JP)

(72) Inventors: Hirokazu Hiraoka, Osaka (JP); Shingo Matsuo, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/313,763

(22) Filed: Jun. 24, 2014

(65) Prior Publication Data

US 2015/0028143 A1  Jan. 29, 2015

(30) Foreign Application Priority Data

Jul. 26, 2013  (JP) ................. 2013-155769

(51) Int. Cl.
*A01K 89/01* (2006.01)
(52) U.S. Cl.
CPC .................. *A01K 89/0111* (2013.01)
(58) Field of Classification Search
CPC .............. A01K 89/01; A01K 89/0111; A01K 89/01931
See application file for complete search history.

(56) References Cited

U.S. PATENT DOCUMENTS

| | | | | |
|---|---|---|---|---|
| 2,797,055 A * | 6/1957 | McDonald | ............ | 242/232 |
| 4,216,921 A * | 8/1980 | Puryear | ............ | 242/318 |
| 4,875,639 A * | 10/1989 | Zurcher | ............ | 242/309 |
| 5,911,378 A * | 6/1999 | Plestan | ............ | 242/322 |
| 5,927,630 A * | 7/1999 | Katayama | ............ | 242/248 |
| 7,401,748 B2 * | 7/2008 | Kitajima et al. | ............ | 242/322 |
| 2004/0041045 A1* | 3/2004 | Sugawara | ............ | 242/307 |
| 2005/0082405 A1* | 4/2005 | Sugawara et al. | ............ | 242/223 |
| 2006/0266861 A1* | 11/2006 | Kitajima et al. | ............ | 242/322 |
| 2007/0029427 A1* | 2/2007 | Morise | ............ | 242/317 |
| 2014/0263791 A1* | 9/2014 | Sabtu et al. | ............ | 242/224 |

FOREIGN PATENT DOCUMENTS

| | | |
|---|---|---|
| FR | 2763478 A1 | 11/1998 |
| JP | 2006-204153 A | 8/2006 |
| JP | 2010-273626 A | 12/2010 |

OTHER PUBLICATIONS

European Search Report of corresponding EP Application No. 14 17 7497.6 dated Dec. 5, 2014.

* cited by examiner

*Primary Examiner* — Emmanuel M Marcelo
(74) *Attorney, Agent, or Firm* — Global IP Counselors (57) ABSTRACT

A line clip of a spinning reel includes a mounting member and a clip member. The mounting member is configured to be mounted to the spool. The clip member is disposed on the mounting member, and is configured to lock the fishing line between the clip member and the surface of the spool. The clip member comprises a mounting end portion having the mounting member attached thereto, the mounting end portion having a predefined width in a circumferential direction of the spool, an introduction end portion configured to have a fishing line introduced thereto, and a movement restriction portion disposed between the mounting end portion and the introduction end portion, having a width that is different from the predefined width, and being configured to restrict the fishing line from moving to the introduction section side.

13 Claims, 8 Drawing Sheets

LINE CLIP AND A SPOOL OF A SPINNING REEL TO WHICH THE LINE CLIP IS MOUNTED

CROSS-REFERENCE TO RELATED APPLICATIONS

This application claims priority to Japanese Patent Application No. 2013-155769, filed on Jul. 26, 2013. The entire disclosure of Japanese Patent Application No. 2013-155769 is hereby incorporated herein by reference.

BACKGROUND

1. Field of Invention

The present invention relates to a spool of a spinning reel and to a line clip that is mounted on the spool of the spinning reel.

2. Background Information

In a conventional spinning reel, a spool of the spinning reel reciprocates back and forth according to the rotation of the reel. The spool of spinning reel has a spool body, a front flange section, and a skirt section. A line clip for holding a fishing line that is mound to the skirt section of the spool of the spinning reel.

This kind of line clip locks the end part of the fishing line that is wound on the spool body and functions to maintain a state in which the fishing line is wound to the spool body.

The line clip has, for example, a synthetic resin clip body and a plate-like attaching section that is integrally formed with the clip body. The clip body is housed, for example, in a recess that is formed on the front outer peripheral surface of the skirt section, is exposed along the outer peripheral surface, and is disposed in order to be able to open to the rear side with a small space between the clip body and the skirt section. The tip of the opening side of the clip body curves in a circle and is formed in a bullet shape in a plan view with a taper so that the width gradually widens from the tip toward the attaching section. The clip body is biased radially inwardly of the spool by a spring member. In a conventional line clip, the retaining force of the fishing line that is stopped by the clip body is increased with a spring member. With this, the fishing line is less likely to come off of the clip body.

For an example of a conventional device, see Japanese Laid-Open Patent Publication No. 2010-273626.

SUMMARY

A conventional line clip is formed in a bullet shape, and the clip member is formed so as to taper. For this reason, there are instances in which the retained fishing line will fall off of the clip member. Specifically, when mounting a wide fishing line, the fishing line is more likely to fall off the clip member. In order to prevent the fishing line from falling off of the clip member, in a conventional line clip, a spring member is installed to increase the retaining force of the fishing line. However, if a spring member is installed, the configuration of the line clip can be complex, increasing the cost of the line clip.

The object of the present invention is to prevent the fishing line from easily falling off the line clip with a cost effective and simple configuration.

The line clip of the spinning reel according to the present invention is mounted on the spool of the spinning reel. The line clip comprises a mounting member that can be mounted on the spool and the clip member for locking the fishing line between clip member and the surface of the spool. The clip member comprises a mounting end portion, an introduction end portion, and a movement restriction portion. The mounting end portion is an end section to which the mounting member is installed and has a predefined width in the circumferential direction of the spool. The introduction end portion is an end section to which the fishing line is introduced. The movement restriction portion is disposed between the mounting end portion and the introduction end portion, has a width that is different from the predefined width, and restricts the fishing line to prevent the line from moving to the introduction section side.

In this line clip, the fishing line that is introduced from the introduction end portion is locked between the clip member and the spool surface. The locked fishing line is disposed between the introduction end portion and the mounting end portion. Between this introduction end portion and the mounting end portion, a movement restriction portion that has a width that is different from the predefined width of the mounting end portion is disposed. For this reason, the movement of the fishing line that is introduced to the clip member is restricted between the introduction end portion and the mounting end portion by the movement restriction portion, and the fishing line becomes less likely to move to the introduction end portion side. Here, since the fishing line that is locked by the clip member is less likely to move to the introduction end portion side due to the movement restriction portion, the fishing line is less likely to fall off of the line clip with a cost effective and simple configuration.

The movement restriction portion can have a projection section that has a width that is wider than the predefined width. In this case, since a projection with a wide width is installed between the mounting end portion and the introduction end portion, the movement of the fishing line to the introduction end portion side is restricted by the projection section, so that the fishing line is less likely to fall off.

The movement restriction portion can have a constricted section that has a width that is narrower than the predefined width. In this case, since a constricted section that has a narrow width is installed between the mounting end portion and the introduction end portion, the fishing line enters the constricted section, and the movement of the fishing line to the introduction end portion side is restricted, so that the fishing line is less likely to fall off.

The movement restriction portion can have a projection section with a wider width than the predefined width and a constricted section with a narrower width than the predefined width. The constricted section is disposed between the projection section and the mounting end portion. In this case, a constricted section and a projection section are installed, and the constricted section is disposed between the projection section and the introduction end portion. For this reason, the fishing line that enters the constricted section and whose movement is restricted is further restricted in movement by the projection section. With this, the movement of the fishing line to the introduction end portion side is restricted in two stages, so that the fishing line is even less likely to fall off.

The constricted section can have a bottom section that is recessed in a circular arc shape. In this case, since the constricted section is recessed in a circular arc shape, the fishing line is less likely to be damaged even if the fishing line enters the constricted section.

The mounting end portion has a first flat part along the circumferential direction of the spool, and the introduction end portion has a protrusion that protrudes along the axial direction of the spool. In this case, since the mounting end portion has a first flat part and the introduction end portion has a protrusion, the fishing line is less likely to be damaged when the fishing line is introduced from the introduction end portion.

The projection section can also have a second flat part. In this case, since a second flat part is disposed on the projection section, the fishing line is easily caught by the projection section, and the fishing line becomes even less likely to fall off.

The second flat part can extend along the circumferential direction of the spool. In this case, since the second flat part that is disposed on the projection section extends along the circumferential direction, the fishing line is even more easily caught, and the fishing line is even less likely to fall off.

The spool of the spinning reel according to the present invention comprises a spool body, a skirt section, and a line clip. Fishing line can be wound around the outer peripheral surface of the spool body. The skirt section is disposed on the rear end section of the spool body and is larger in diameter than the spool body. The line clip is a line clip that is mounted to the above-described skirt section.

In this spool of a spinning reel, a spool with the above-described effects can be obtained.

The spinning reel can further comprise a sheet member that is disposed between the skirt section and the line clip. In this case, since the fishing line is disposed between the clip member and the sheet member, the fishing line is less likely to come off due to the friction with the sheet member.

The sheet member can also have a rectangular notched portion that is disposed on the introduction end portion side of the line clip. In this case, a space into which the fishing line enters can be secured between the clip member and the skirt section, and the fishing line slides on the spool surface, facilitating the introduction between the clip member and the skirt section.

The rear end section of the sheet member can be disposed rearward of the introduction end portion of the clip member. In this case, the sheet member that is disposed in the skirt section is disposed rearward of the introduction end portion to which the fishing line is introduced. For this reason, even if a notched portion is formed, the fishing line will not easily enter between the sheet member and the skirt section when introducing the fishing line from the introduction end portion to the clip member.

The skirt section can have a sheet member disposed in at least one part and can have a recess for mounting the line clip. In this case, the protrusion amount of the clip member from the outer peripheral surface of the skirt section is small, minimizing the likelihood that slacked fishing line will be caught by the clip member.

The recess comprises an opening through which the mounting member of the line clip can pass. In this case, since the mounting member can be mounted to the spool body in the skirt, the clip member can be securely mounted to the skirt section, and the protrusion amount from the outer peripheral surface of the skirt section is small, minimizing the likelihood that slacked fishing line will be caught by the clip member.

According to the present invention, since the fishing line that is locked by the clip member is less likely to move to the introduction end portion side due to the movement restriction portion, the fishing line is less likely to come off of the line clip with a cost effective and simple configuration.

DETAILED DESCRIPTION OF EMBODIMENTS

First Embodiment

Figure 1:
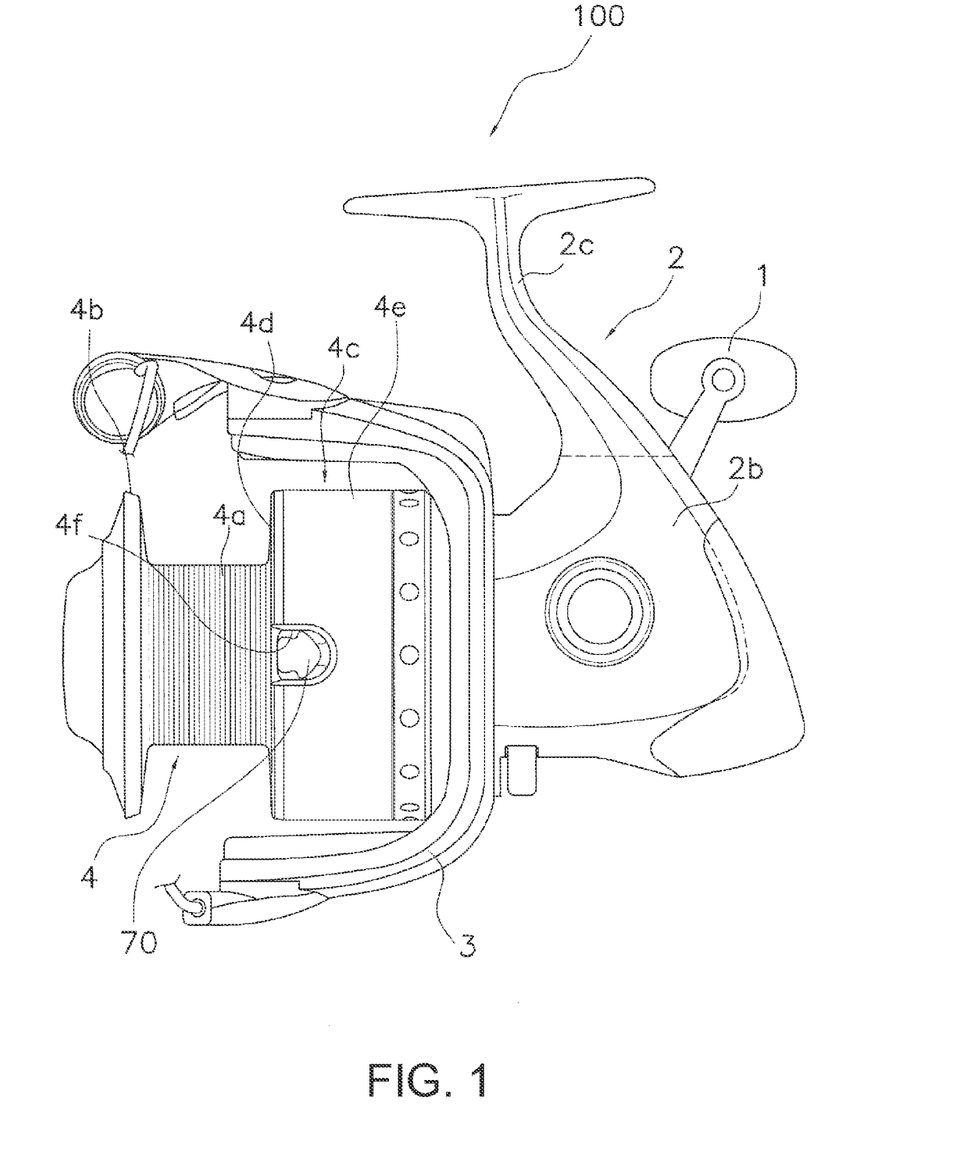
FIG. 1 is a side view of a spinning reel that employs the first embodiment of the present invention.

The spinning reel 100 employing the first embodiment of the present invention, as shown in FIG. 1, comprises a reel main body 2 that rotatably supports a handle 1, a rotor 3, and a spool 4. The rotor 3 is used for winding the fishing line onto the spool 4 and is rotatably supported by the front part of the reel main body 2. The spool 4 is used to wind the fishing line onto the outer peripheral surface and is disposed in order to be movable to the front and back of the front part of the rotor 3. Meanwhile, the handle 1 can be attached to either the left side or the right side of the reel main body 2. Here, when fishing and referring to the front and the back, the front refers to the direction in which the fishing line is unreeled, and the opposite direction is referred to as the back. Additionally, the left and right refer the left and right when looking at the spinning reel 100 from the rear.

Figure 2:
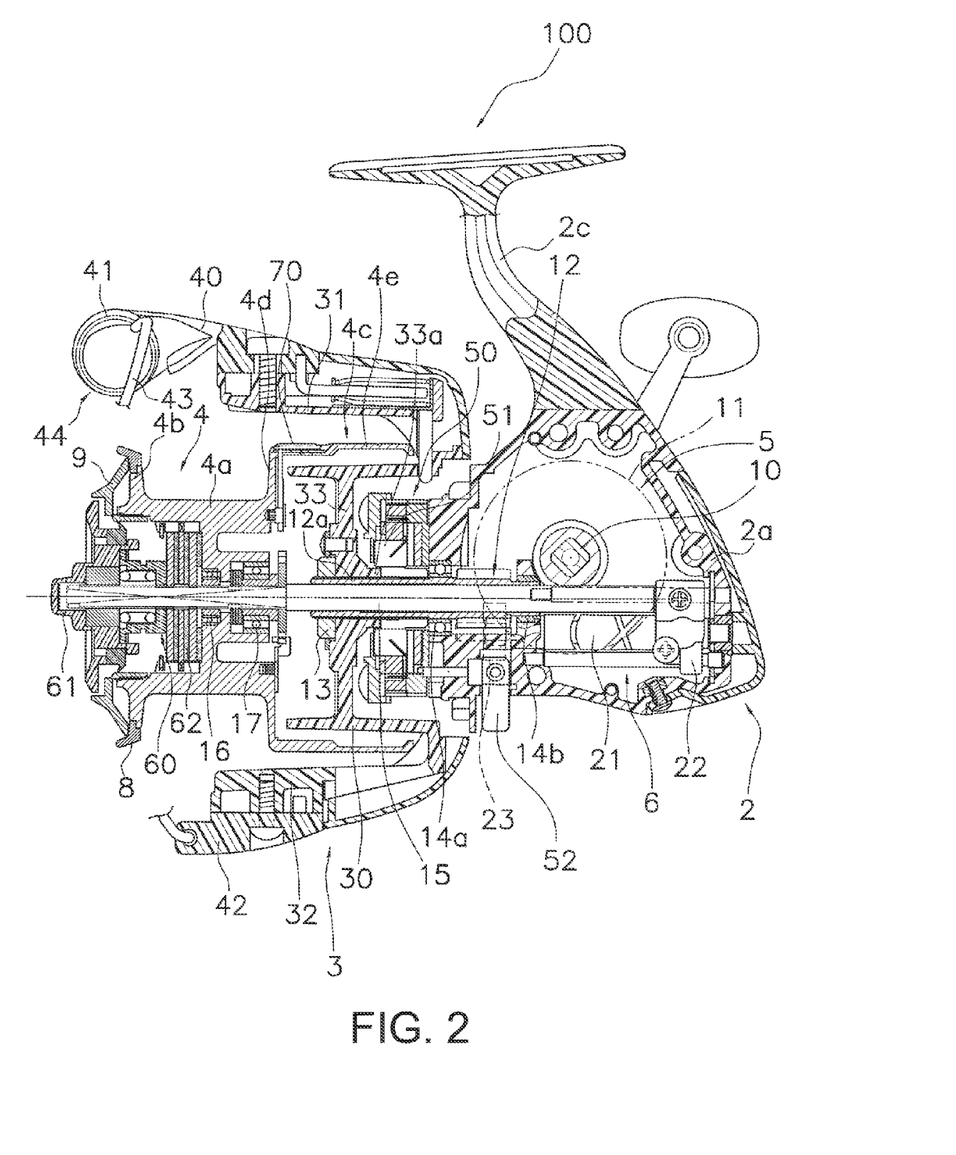
FIG. 2 is a lateral cross-sectional view of the spinning reel.

The reel main body 2, as shown in FIG. 1 and FIG. 2, comprises a reel body 2a that has an opening, a lid member 2b that is detachably fitted to the reel body 2a so as to plug the opening, and a pole attaching leg 2c that extends obliquely upward and forward from the lid member 2b. The reel body 2a has an empty space inside. Installed in this empty space are a rotor drive mechanism 5 that rotates the rotor 3 in conjunction with the rotation of the handle 1 and an oscillating mechanism 6 for evenly winding the fishing line by moving the spool 4 to the front and back.

The rotor drive mechanism 5, as shown in FIG. 2, comprises a drive gear 11 that rotates with the drive gear axle 10 to which the handle 1 is fixed and a pinion gear 12 that meshes with this drive gear 11. The pinion gear 12 is formed in a tubular shape and extends through the center part of the rotor 3. The front part 12a of the pinion gear 12 is fixed to the rotor 3 by a nut 13. Additionally, the intermediate part and the rear end part of the pinion gear 12 are rotatably supported by the reel main body 2, each via axle bearings 14a and 14b.

The oscillating mechanism 6, as shown in FIG. 2, is a mechanism for moving the spool 4 longitudinally along with a drag mechanism 60 by moving a spool axle 15 that extends through the center part of the spool 4 and is coupled to the drag mechanism 60 in the longitudinal direction. The oscillating mechanism 6 has a screw shaft 21 that is disposed parallel below the spool axle 15, a slider 22 that moves along the screw shaft 21 in the longitudinal direction, and an intermediate gear 23 that is fixed to the tip of the screw shaft 21. The slider 22 is fixed non-rotatably to the rear end of the spool axle 15. The intermediate gear 23 interlocks with the pinion gear 12 via a decelerating mechanism that is not diagrammed. With this decelerating mechanism, the speed of the longitudinal movement of the oscillating mechanism 6 becomes slow, so that the fishing line can be precisely wound onto the spool 4.

The rotor 3, as shown in FIG. 2, has a coupling section 30 that is integrally and rotatably coupled to the pinion gear 12, a first rotor arm 31 and a second rotor arm 32 that are installed facing each other on the sides of the coupling section 30. The coupling section 30, the first rotor arm 31, and the second rotor arm 32 are integrally formed.

A front wall 33 is formed on the front part of the coupling section 30, and a boss part 33a is installed in the central part of this front wall 33. A through-hole is formed in the center part of the boss part 33a, and the front part 12a of the pinion gear 12 and the spool axle 15 extend through this penetrating hole. A nut 13 is disposed in the front part of the front wall 33, and with this nut 13, the front part 12a of the pinion gear 12 is fixed to the rotor 3.

The first rotor arm 31 extends forward while being curved convexly outwardly from the coupling section 30. A first bale support member 40 is pivotally attached on the outer peripheral side of the tip of the first rotor arm 31. A line roller 41 for guiding the fishing line to the spool 4 is mounted on the tip of the first bale support member 40. The second rotor arm 32 extends forward while being curved convexly outward from the coupling section 30. A second bale support member 42 is pivotally attached on the outer peripheral side of the tip of the second rotor arm 32. A bale 43 that curves a cotton material in a roughly U shape is fixed between the line roller 41 and the second bale support member 42. The first bale support member 40, the second bale support member 42, the line roller 41 and the bale 43 form a bale arm 44. The bale arm 44 can pivot between a line guiding position shown in FIG. 2 and an inverted line releasing position.

A reverse rotation prevention mechanism 50 that prohibits/releases the reverse rotation of the rotor 3 is disposed inside of the coupling section 30 of the rotor 3. The reverse rotation prevention mechanism 50 has a roller-type one-way clutch 51 with an idling inner ring and a switching mechanism 52 that switches the one-way clutch 51 between the operating state (the reverse rotation prohibited state) and the non-operating state (the reverse rotation permitted state).

The spool 4 is, for example, a large and small two-step cylindrical member that is obtained by forge forming an aluminum alloy. The spool 4 is disposed between the first rotor arm 31 and the second rotor arm 32 of the rotor 3. The spool 4 is mounted to the tip of the spool 15 via the drag mechanism 60. The spool 4 is rotatably mounted to the spool shaft 15 by two axle bearings 16 and 17. The spool 4 has a tubular spool body 4a with outer periphery on which the fishing line is wound, a front flange section 4b that is integrally formed on the front part of the spool body 4a, a large-diameter tubular skirt section 4c that is integrally formed on the rear part of the spool body 4a, and a line clip 70 according to the first embodiment of the present invention. The spool body 4a is a member that is integrally formed with the front flange section 4b and the skirt section 4c, and the drag mechanism 60 is mounted on the front side.

A spool ring collar 8 that has a convergently tapered surface for smoothly unreeling the fishing line when casting is fitted on the outer peripheral part of the front flange section 4b. The spool ring collar 8 is fixed to the front flange section 4b by a fixing member 9 that is mounted to the front end of the spool body 4a. The fixing member 9 is screwed onto the inner peripheral surface of the spool body 4a.

Figure 3:
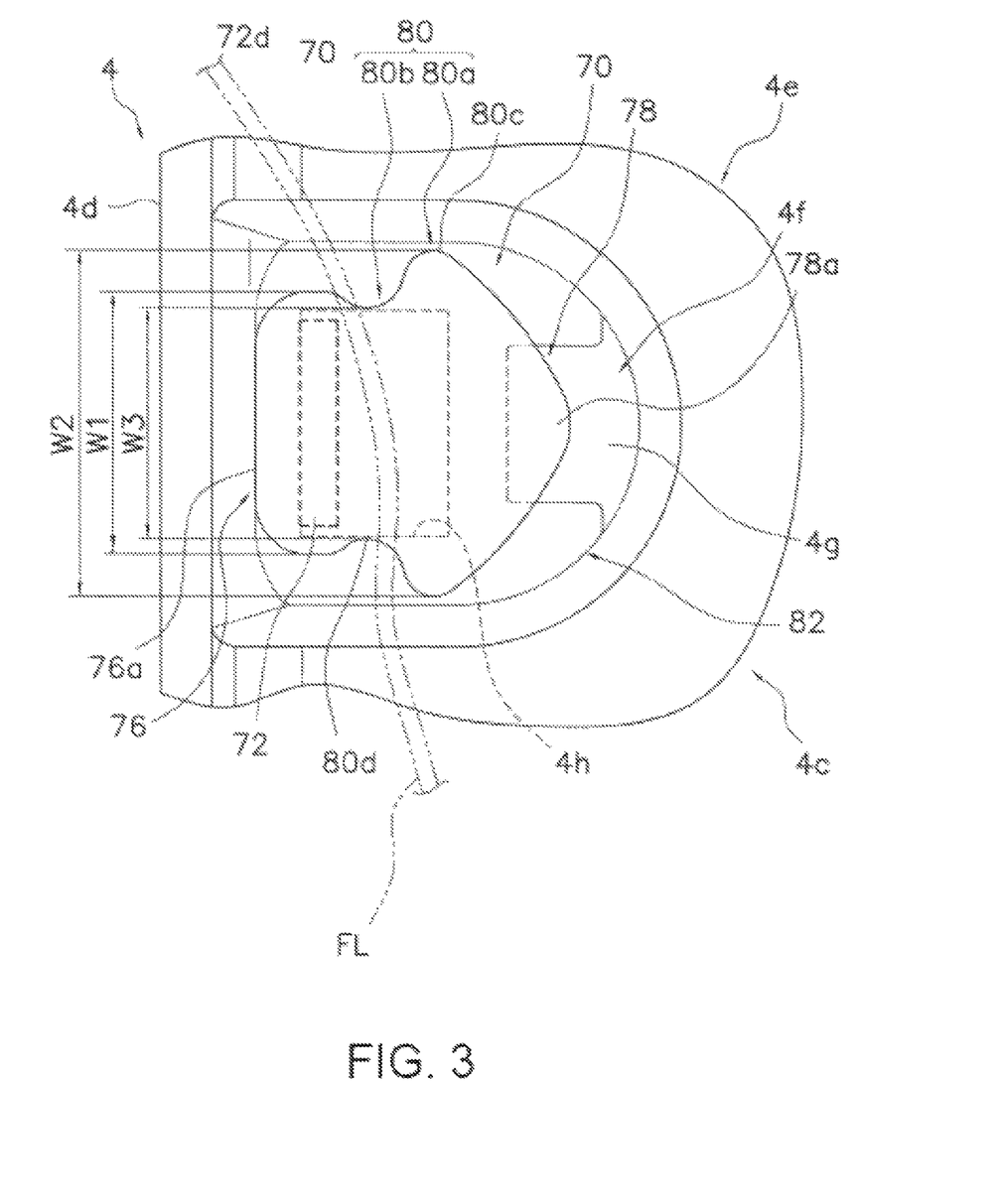
FIG. 3 is a plan view of the line clip according to the first embodiment of the present invention.
Figure 4:
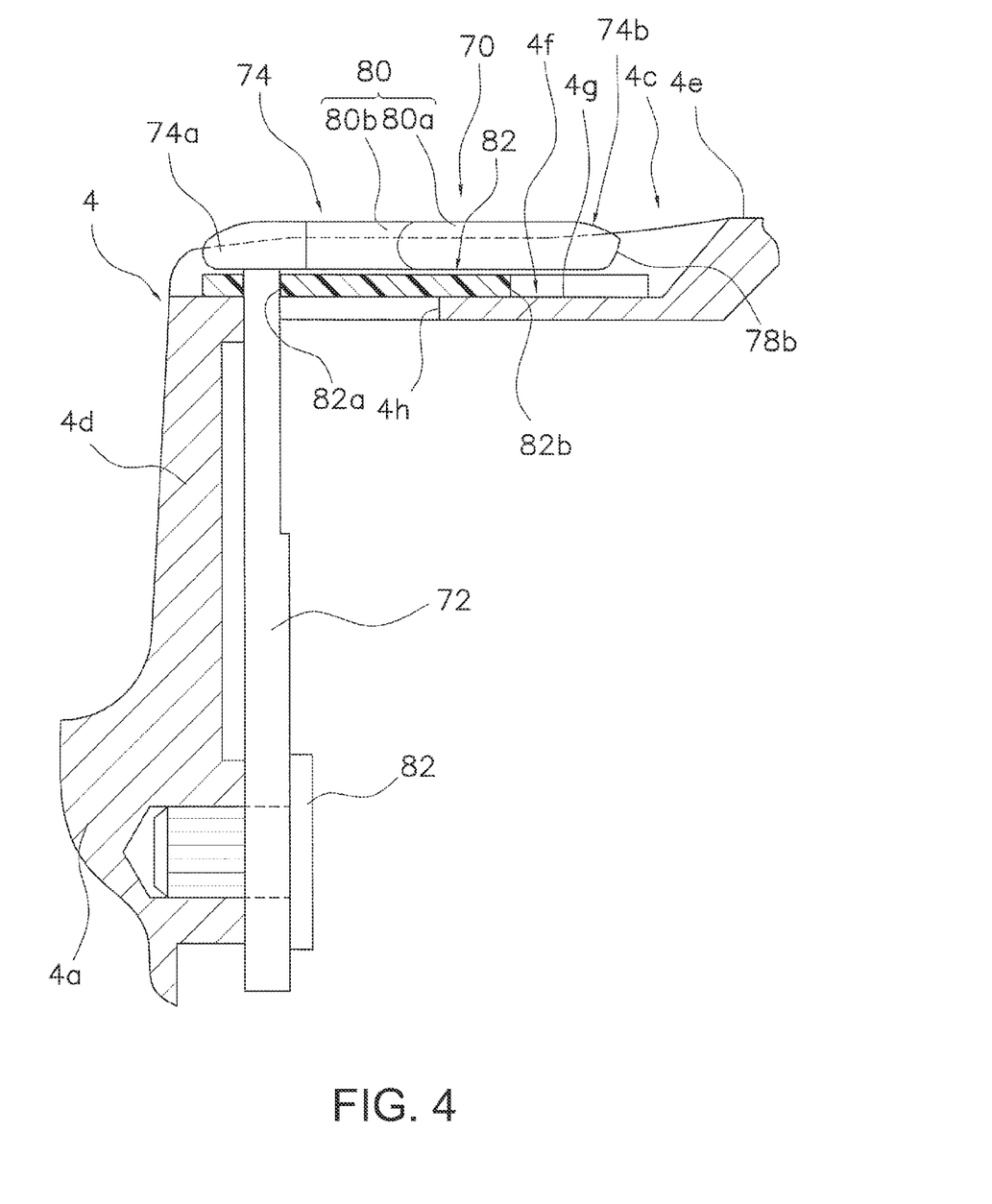
FIG. 4 is an enlarged lateral cross-sectional view of the line clip.
Figure 5:
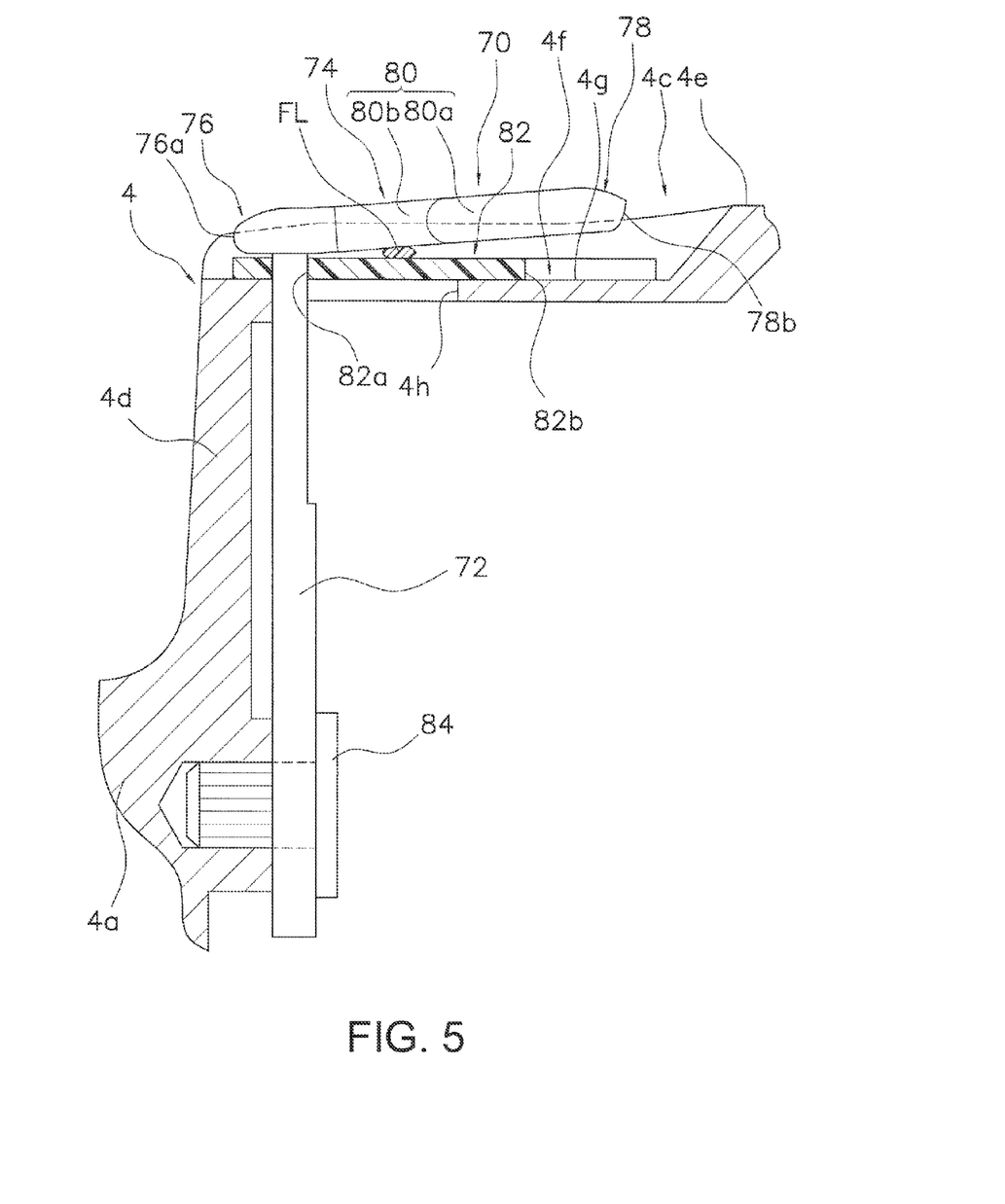
FIG. 5 is a diagram showing a state in which a fishing line is locked by the line clip corresponding to FIG. 4.

The skirt section 4c has a rear flange section 4d that is disposed facing the front flange section 4b and a tubular section 4e that is integrally formed on the outer peripheral part of the rear flange section 4d. Additionally, the skirt section 4c comprises a sheet member 82. The skirt section 4c is integrally forge formed in a tube-shape with the spool body 4a so as to cover the coupling section 30 of the rotor 3. Furthermore, on the outer peripheral surface of the boundary part of the rear flange section 4d and the tubular section 4e of the skirt section 4c, as shown in FIG. 3, FIG. 4, and FIG. 5, a recess 4f is formed that has a flat bottom surface 4g to which the line clip 70 can be mounted. The recess 4f is formed so that the rear part is recessed in a semi-circular bullet shape. On the front part of the rear flange section 4d side of the recess 4f a rectangular first opening 4h through which the line clip 70 can pass is formed. A mounting member 72, mentioned below, can pass through the first opening 4h and is also formed extending to the position in which a fishing line FL (refer to FIG. 5) that is locked by the line clip 70 is locked. The sheet member 82 is mounted between the clip member (clip body) 74 of the line clip 70 mentioned below and the bottom surface 4g of the recess 4f. The sheet member 82 is disposed so that the fishing line FL is guided smoothly, so that the fishing line will not be damaged, and so that the fishing line FL will not be easily misaligned due to friction.

The line clip 70, as shown in FIG. 3, FIG. 4, and FIG. 5, comprises a mounting member 72 that can be mounted to the spool 4 and a clip member 74 for locking the fishing line FL between the clip member and the surface of the recess 4f. The mounting member 72 is a plate-like section that is disposed nearly perpendicularly with the clip member 74. The mounting member 72 extends through the first opening 4h and extends from the inside of the skirt section 4c further to the rear surface of the spool body 4a. The tip of the extended mounting member 72 is fixed by a stud bolt 84. The line clip 70 is a synthetic resin member that is elastic.

The clip member 74 is installed facing the outer peripheral part of the recess 4f exposed outwards. The clip member 74 is a part that is roughly arrow-shaped with rounded corners. The clip member 74 sandwiches the fishing line FL with a sheet member 82 that is disposed on the bottom surface 42 of the recess 4f. The clip member 74 comprises a mounting end portion 76, an introduction end portion 78, and a movement restriction portion 80. The mounting end portion 76 is an end part to which the mounting member 72 is integrally installed and has a first width W1 in the circumferential direction of the spool 4 (the up-and-down direction of the sheet in FIG. 3) The first width W1 is one example of a predefined width W1. The mounting end portion 76 comprises a first flat part 76a along the circumferential direction.

The introduction end portion 78 is an end part where the fishing line FL is introduced. The introduction end portion 78 comprises a protrusion 78a that protrudes in the axial direction of the spool 4 in a nearly chevron shape and an inclined introduction surface 78b that is disposed in a part near the sheet member 82 of the protrusion 78a and that is for introducing the fishing line FL (refer to FIG. 4 and FIG. 5). The tip part of the protrusion 78a is rounded to prevent damage to the fishing line FL. The introduction surface 78b is inclined in order to approach the mounting end portion 76 when approaching the sheet member 82.

The movement restriction portion 80 is disposed between the mounting end portion 76 and the introduction end portion 78 and comprises a width that is different from the first width W1 in the circumferential direction of the spool 4. In the first embodiment, the movement restriction portion 80 comprises a projection section 80a having a second width W2 that is wider than the first width W1 and a constricted section having a third width W3 that is narrower than the first width W1. The constricted section 80b is disposed between the projection section 80a and the mounting end portion 76. The projection section 80a comprises a maximum width section 80c that defines the second width W2. The projection section 80a is formed protruding in a nearly chevron shape in one direction and the other direction of the circumferential direction of the spool 4. The maximum width section 80c is rounded in a circular arc shape to prevent damage to the fishing line FL. The constricted section 80b is formed recessed in a nearly circular arc shape in one direction and the other direction of the circumferential direction of the spool 4. The constricted section 80b comprises a bottom section 80d that is recessed in a circular arc shape. The width of this bottom section 80d is the minimum width section that defines the third width W3, and the fishing line FL is retained at the bottom section 80d.

The sheet member 82 is, for example, a synthetic resin with a high sliding ability such as polyacetal. The sheet member 82 is a member with roughly the same outer shape as the bottom surface 4g and comprises a rectangular second opening 82a through which the mounting member 72 can pass, and a rectangular notched portion 82b that is installed on the introduction end portion 78 side of the clip member 74. The opening area, of the second opening 82a is smaller than the first opening 4h and has a minimum area through which the mounting member 72 can pass. The rear end part of the sheet member 82, specifically, the rear end part where the notched portion 82b is formed, is disposed rearward of the introduction end portion 78 of the clip member 74 (the right side in FIG. 3). In this way, by installing a notched portion 82b on the sheet member 82, a space in which the fishing line FL enters between the clip member 74 and the recess 4f can be secured. For this reason, introducing the fishing line FL between the clip member 74 and the recess 4f is simple, and the fishing line FL slips over the bottom surface 4g of the recess 4f to facilitate the introduction. Additionally, since the rear end part of the sheet member 82 is disposed rearward of the introduction end portion 78, even if a notched portion 82b is formed, there is a smaller likelihood that the fishing line FL will enter between the sheet member 82 and the recess 4f when introducing the fishing line FL from the introduction end portion 78 to the clip member 74. Also, the first opening 4h of the recess 4f is formed to the position where the fishing line FL is locked, that is, to the part where the movement restriction portion 80 is installed. For this reason, in the part where the first opening 4h is formed, the fishing line FL is sandwiched by just the sheet member 82 and the clip member 74. With this, the fishing line FL is retained by the elasticity of the sheet member 82 and the elasticity of the clip member 74, minimizing the likelihood that the fishing line FL will be crushed, and the housing of the fishing line is improved.

In a line clip 70 that is configured in this way, since the fishing line FL that is locked by the clip member 74 becomes less likely to move to the introduction end portion 78 side by the movement restriction portion 80, the fishing line is less likely to come off of the line clip 70 with a cost effective and simple configuration.

The drag mechanism 60 is mounted between the spool 4 and the spool axle 15 and is a mechanism to apply the drag force to the spool 4. The drag mechanism 60 has a knob part 61 for adjusting the drag force manually and a plurality of drag plates 62 that are pressed to the spool 4 side by the knob part 61.

Next, the reel operation and behavior are explained.

When fishing, in order to unreel the fishing line from the reel main body 2 by casting, the bale arm 44 is inverted, and the bale arm 44 is put in a line releasing position. In this state, the fishing pole is cast while the index finger of the hand that holds the fishing pole hooks the fishing line. Then, the fishing line will be swiftly released forward due to the weight of the rig. If the handle 1 is rotated in the line winding direction, the rotor 3 rotates in the line winding direction by the rotor drive mechanism 5, and the bale arm 44 is returned to the line winding position by a bale returning mechanism (not shown); thus, the fishing line is wound onto the spool 4.

When one is done fishing, the spinning reel 100 is taken off of the fishing pole and the spinning reel 100 is put away, the tip part of the fishing line is hooked onto the line clip 70. At this time, by picking up the introduction end portion 78 of the clip member 74 with the fingertips, a gap is formed between the clip member 74 and the recess 4f. By clamping the fishing line FL in this gap, the fishing line FL is locked by the clip member 74. At this time, since a movement restriction portion 80 with a different width than the first width W1 of the mounting end portion 76 is disposed in a part where the fishing line FL is locked between the mounting end portion 76 and where the fishing line FL is locked by the clip member 74 and the introduction end portion 78, the fishing line FL that is locked by the clip member 74 is less likely to move to the introduction end portion 78 side by the movement restriction portion 80. With this, the fishing line FL is less likely to come off of the line clip 70 with a cost effective and simple configuration.

Modified Example of the First Embodiment

Figure 6:
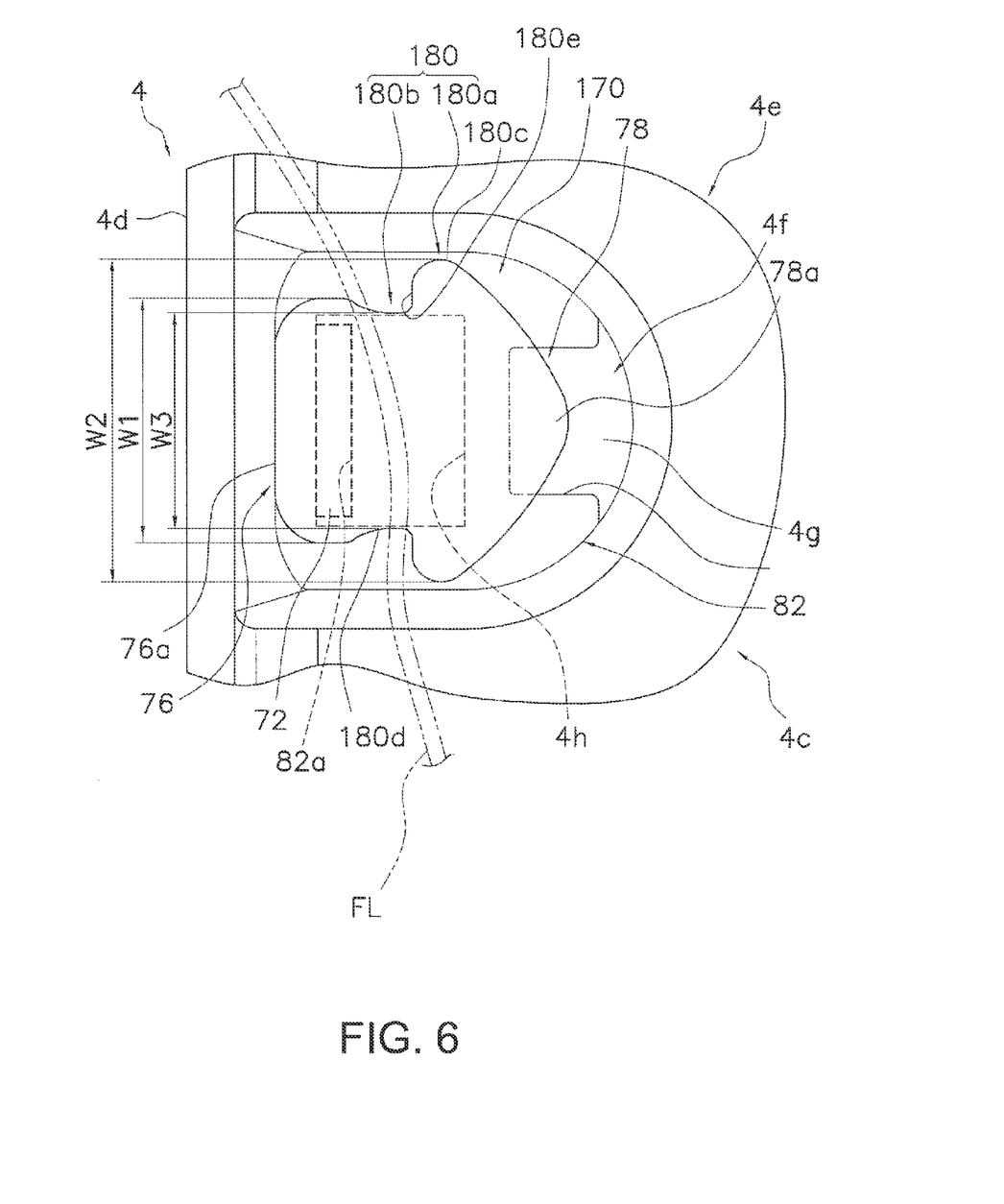
FIG. 6 is a diagram of a line clip according to a modified example of the first embodiment corresponding to FIG. 3.

In a modified example shown in FIG. 6, the shape of the movement restriction portion 180 of the line clip 170 differs from the above-described embodiment.

The movement restriction portion 180 comprises a projection section 180a and a constricted section 180b. The projection section 180a, unlike in the first embodiment, comprises a second flat part 180e that is formed along the circumferential direction of the spool 4 in a part in which the constricted section 180b connects to the maximum width section 180c. Additionally, since a second flat part 180e is formed, the shape of the bottom section 180d of the constricted section 180b differs from the first embodiment, and a circular arc with a diameter that is smaller than the bottom section 180d is formed between the second flat part 180e. The other configurations are the same as those in the above-described embodiment, so the same reference symbols will be given and the explanations have been omitted. In a modified example configured in this way, the same effects as those in the above-described embodiment will be realized. Additionally, in the modified example, since a second flat part 180e along the circumferential direction of the spool 4 is installed, the fishing line FL is even less likely to move to the introduction end portion 78 side, and the fishing line FL is even less likely to come off.

Second Embodiment

Figure 7:
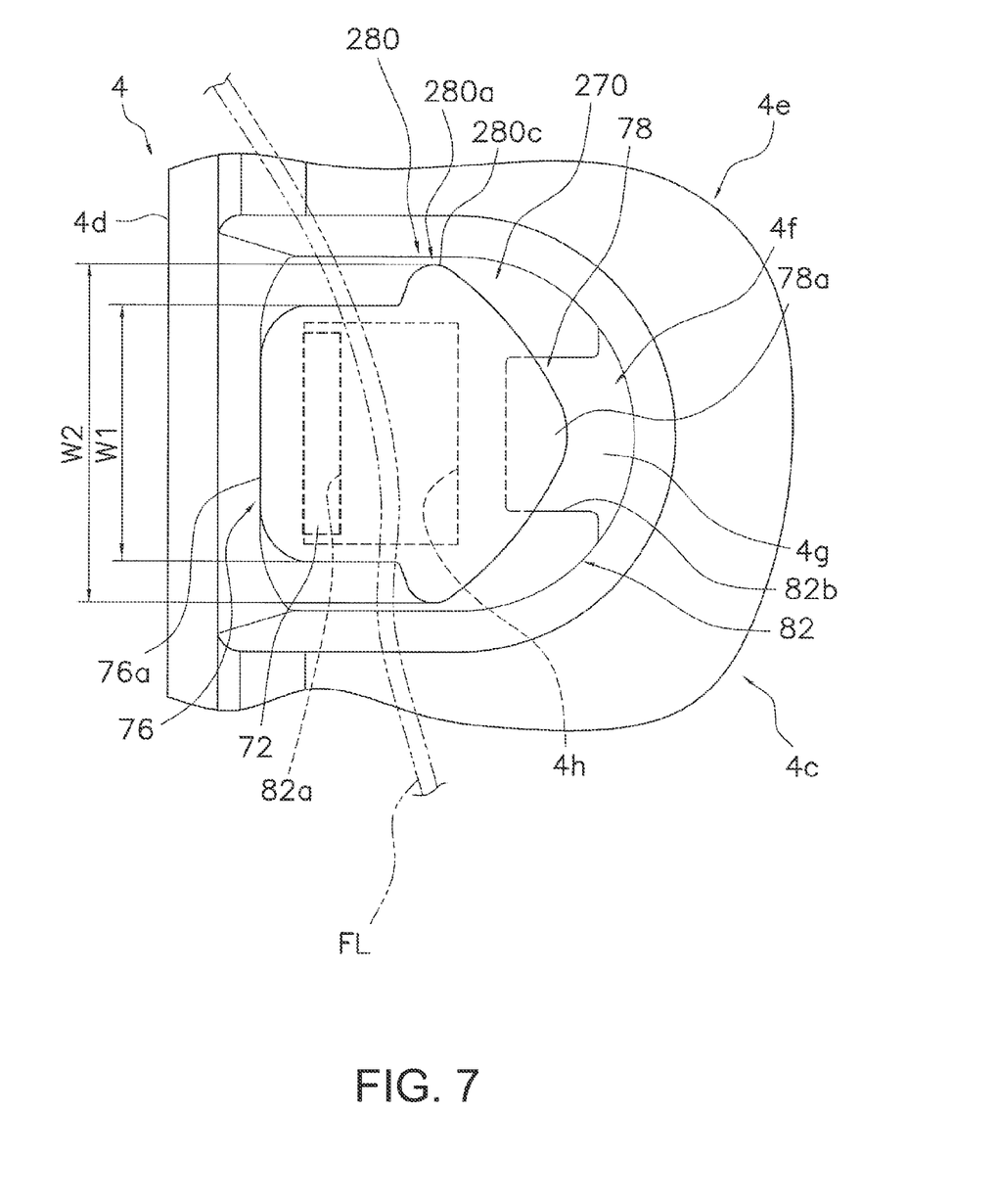
FIG. 7 is a diagram of a line clip according to the second embodiment of the present invention corresponding to FIG. 3.

In the line clip 70 of the first embodiment, the movement restriction portion 80 comprises a projection section 80a and a constricted section 80b, but in the line clip 270 of the second embodiment shown in FIG. 7, this section only comprises a projection section 280a that has a maximum width section 280c with a second width W2 that is wider than the first width W1. The other configurations are the same as those in the first embodiment, so the same reference symbols have be given in FIG. 7 and the explanations thereof have been omitted. In this kind of second embodiment, since there is no constricted section, the fishing line is more likely to move to the introduction end portion 78 side than the line clip 70 of the first embodiment. However, since there is no constricted section, the fishing line FL is less likely to come off with an even more cost effective and simpler configuration.

Third Embodiment

Figure 8:
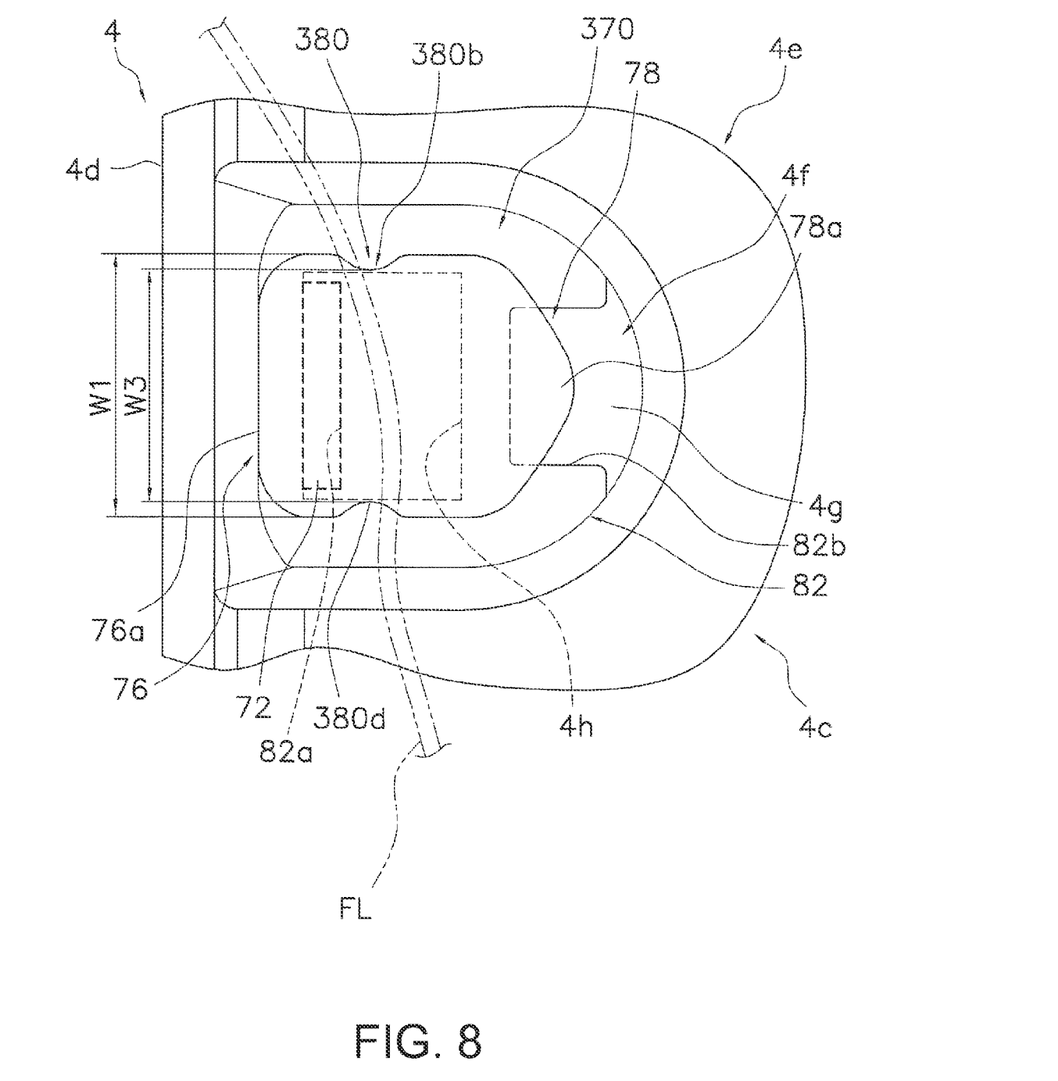
FIG. 8 is a diagram of a line clip according to the third embodiment of the present invention corresponding to FIG. 3.

In the line clip 70 of the first embodiment, the movement restriction portion 80 comprises a projection section 80a and a constricted section 80b, but in the line clip 370 of the third embodiment shown in FIG. 8, the movement restriction portion 380 only comprises a constricted section 380b that has a third width W3 that is narrower than the first width W1. The other configurations are the same as those in the first embodiment, so the same reference symbols have be given in FIG. 8 and the explanations thereof have been omitted. In the third embodiment, since there is no projection section, the fishing line is more likely to move to the introduction end portion 78 side than the line clip 70 of the first embodiment. However, since there is no projection section, the fishing line FL is less likely to come off with an even more cost effective and simpler configuration.

Other Embodiments

One embodiment of the present invention was described above, but the present invention is not limited to the above-described embodiment; various modifications can be made without departing from the scope of the invention. Specifically, the various embodiments and modified examples described in the present Specification can be freely combined according to necessity.

(a) In the above-described embodiment, a spinning reel comprising a front drag mechanism is described as an example, but the present invention is not limited to this structure. For example, the present invention can be applied to all spinning reels, such as a spinning reel having a rear drag mechanism or a spinning reel that has a lever brake mechanism that controls the rotor, etc.

(b) In the above-described embodiment, the attaching section of the line clip was fixed to the rear surface of the spool body 4a, but the present invention is not limited to this structure. The attaching section can be disposed on the rear surface of the spool body so as to be movable in the radial direction and biased radially inward.

(c) In the above-described embodiment, a sheet member 82 is installed, but a sheet member does not have to be installed. Also, when a sheet member is installed, the notched portion 82b disclosed in the above-described embodiment does not have to be installed. Additionally, the opening can be made to be a size that will only pass through the mounting member 72, and installing this section at the position where the fishing line is locked is not necessary.

(d) In the above-described embodiment, the tubular section 4c of the skirt section 4c has a shape to house the coupling section 30 of the rotor 3, but the spool of the present invention is not limited to this structure. The present invention can be applied to a spool in which the coupling section of the rotor is housed in the spool body. In this case, the length of the cylindrical part of the skirt section in the spool axle direction becomes short.

Characteristics

The embodiment described above can be expressed as the following.

(A) The line clip 70 of the spinning reel 100 is mounted to the spool 4 of the spinning reel 100. The line clip 70 comprises a mounting member 72 that can be mounted to the spool 4 and a clip member 74 that is disposed in the mounting member 72 and that locks the fishing line between this section and the surface of the spool 4. The clip member 74 comprises a mounting end portion 76, an introduction end portion 78, and a movement restriction portion 80. The mounting end portion 76 is an end section on which the mounting member 72 is disposed and has a first width in the circumferential direction of the spool 4. The introduction end portion 78 is an end part where the fishing line FL is introduced. The movement restriction portion 80 is disposed between the mounting end portion 76 and the introduction end portion 78, has a second width W2 (a third width W3) that is different from the first width W1, and restricts the fishing line FL from moving to the introduction end portion 78 side.

In this line clip, the fishing line FL that is introduced from the introduction end portion 78 is locked between the clip member 74 and the surface of the spool 4. The locked fishing line FL is disposed between the introduction end portion 78 and the mounting end portion 76. Between this introduction end portion 78 and the mounting end portion 76 a movement restriction portion 80 is disposed, and which comprises a second width W2 (a third width W3) that is different from the first width W1 of the mounting end portion 76. For this reason, the movement of the fishing line FL that is introduced to the clip member 74 is restricted between the introduction end portion 78 and the mounting end portion 76 by the movement restriction portion 80, and the fishing line FL is less likely to move to the introduction end portion 78 side. Here, since the fishing line FL that is locked by the clip member 74 is less likely to move to the introduction end portion 78 side due to the movement restriction portion 80, the fishing line FL is less likely to come off of the line clip 70 with a cost effective and simple configuration.

(B) The movement restriction portion 80 can have a projection section 80a that has a second width W2 that is wider than the first width W1. In this case, since a projection 80a with a wide width is disposed between the mounting end portion 76 and the introduction end portion 78, the movement of the fishing line FL to the introduction end portion 78 side is restricted by the projection section 80a, so that the fishing line FL is less likely to come off.

(C) The movement restriction portion 80 can have a constricted section 80b that has a third width W3 that is narrower than the first width W1. In this case, since a constricted section 80b that has a narrow width is disposed between the mounting end portion 76 and the introduction end portion 78, the fishing FL line enters the constricted section 80b, and the movement of the fishing line FL to the introduction end portion 78 side is restricted, so that the fishing line FL is less likely to come off.

(D) The movement restriction portion 80 can comprise a project on section 80a having a second width W2 that is wider than the first width W1 and a constricted section 80b having a third width W3 that is narrower than the first width W1. The constricted section 80b is disposed between the projection section 80a and the introduction end portion 78. In this case, a constricted section 80b and a projection section 80a are installed, and the constricted section 80b is disposed between the projection section 80a and the introduction end portion 78. For this reason, the fishing line FL that enters the constricted section 80b and movement of which is restricted is further restricted in movement by the projection section 80a. With this, the movement of the fishing line FL to the introduction end portion 78 side is restricted in two stages, so that the fishing line FL is even less likely to come off.

(E) The constricted section 80b can have a bottom section 80d that is recessed in a circular arc shape. In this case, since the constricted section 80b is recessed in a circular arc shape, the fishing line FL is less likely to be damaged even if the fishing line FL enters the constricted section 80b.

(F) The mounting end portion 76 has a first flat part 76a along the circumferential direction of the spool 4, and the introduction end portion 78 has a protrusion 78a that protrudes along the axial direction of the spool 4. In this case, since the mounting end portion 76 has a first flat part 76a and the introduction end portion 78 has a protrusion 78a, the fishing line FL is less likely to be damaged when the fishing line FL is introduced from the introduction end portion 78.

(G) The projection section 180a can also have a second flat part 180e. In this case, since a second flat part 180e is disposed in the projection section 180a, the fishing line FL is easily caught by the projection section 180a, and the fishing line FL is even less likely to come off.

(H) The second flat part 180e can extend along the circumferential direction of the spool 4. In this case, since the second flat part 180e that is disposed in the projection section 180a extends along the circumferential direction, the fishing line FL is even more easily caught, and the fishing line FL is even less likely to come off.

(I) The spool 4 of the spinning reel 100 comprises a spool body 4a, skirt section 4c, and a line clip 70. Fishing line can be wound around the outer peripheral surface of the spool body 4a. The skirt section 4c is disposed on the rear end section of the spool body 4a and is larger in diameter than the spool body 4a. The line clip 70 is the line clip 70 described above.

In this spool 4 of a spinning reel 100, a spool 4 with the above-described effects can be obtained.

(J) The spinning reel 100 can further comprise a sheet member 82 that is disposed between the skirt section 4c and the line clip 70. In this case, since the fishing line FL is disposed between the clip member 74 and the sheet member 82, the fishing line FL is less likely to come off due to friction with the sheet member 82.

(K) The sheet member 82 can also have a rectangular notched portion 82b that is disposed on the introduction end portion 78 side of the line clip 70. In this case, a space into which the fishing line FL, enters can be secured between the clip member 74 and the skirt section 4c, facilitating the introduction of the fishing line FL between the clip member 74 and the skirt section 4c.

(L) The rear end section of the sheet member 82 can be disposed rearward of the introduction end portion 78 of the clip member 74. In this case, the sheet member 82 that is disposed in the skirt section 4e is disposed rearward of the introduction end portion 78 to which the fishing line FL is introduced. For this reason, even if a notched portion 82b is formed, the fishing line FL will not easily enter between the sheet member 82 and the skirt section 4c When introducing the fishing line FL from the introduction end portion 78 to the clip member 74.

(M) The skirt section 4c can have a sheet member 82 disposed in at least one part and can have a recess 4f for mounting the line clip 70. In this case, the protrusion amount of the clip member 74 from the outer peripheral surface of the skirt section 4c is small, minimizing the likelihood that slacked fishing line will be caught by the clip member 74.

(N) The recess 4f comprises a first opening 4h through which the mounting member 72 of the line clip 70 can pass. In this case, since the mounting member 72 can be mounted to the spool body 4a in the skirt section 4c, the clip member 74 can be securely mounted to the skirt section 4c, and the protrusion amount from the outer peripheral surface of the skirt section 4c is small, minimizing the likelihood that slacked fishing line will be caught by the clip member 74.

What is claimed is:

1. A line clip of a spinning reel to be mounted to a spool of a spinning reel, the line clip comprising:
a mounting member configured to be mounted to the spool; and
a clip member disposed on the mounting member, and being configured to hold a fishing line between the clip member and a surface of the spool,
the clip member comprising
a mounting end portion having the mounting member attached thereto, the mounting end portion having a predefined width in a circumferential direction of the spool,
an introduction end portion configured to have a fishing line introduced thereto, and
a movement restriction portion disposed between the mounting end portion and the introduction end portion, having a width in a circumferential direction that is different from the predefined width, and being configured to restrict the fishing line from moving to an introduction section side of the clip member, the movement restriction portion comprising a constricted section having a width that is narrower than the predefined width in a circumferential direction.

2. The line clip recited in claim 1, wherein
the movement restriction portion comprises a projection section having a width that is wider than the predefined width.

3. The line clip recited in claim 1, wherein
the movement restriction portion has a projection section with a width wider than the predefined width,
and the constricted section is disposed between the projection section and the mounting end portion.

4. The line clip recited in claim 3, wherein
the constricted section comprises a bottom part recessed in a circular arc shape.

5. The line clip recited in claim 1, wherein
the mounting end portion comprises a first flat part disposed along the circumferential direction of the spool, and
the introduction end portion comprises a protrude part disposed so as to protrude along an axial direction of the spool.

6. The line clip recited in claim 1, wherein
the movement restriction portion comprises a second flat part.

7. The line clip recited in claim 6, wherein
the second flat part extends along the circumferential direction of the spool.

8. A spool of a spinning reel, comprising:
a spool body having an outer peripheral surface and a rear end part, the outer peripheral surface configured to have a fishing line wound thereon;
a skirt section disposed on the rear end part of the spool body, the skirt section having a diameter that is larger than a diameter of the spool body; and
the line clip recited in claim 1, the line clip being disposed on the skirt section.

9. A spool of a spinning reel, comprising:
a spool body having an outer peripheral surface and a rear end part, the outer peripheral surface configured to have a fishing line wound thereon;
a skirt section disposed on the rear end part of the spool body, the skirt section having a diameter that is larger than a diameter of the spool body;
a line clip comprising
a mounting member configured to be mounted to the spool, and a clip member disposed on the mounting member, and being configured to hold a fishing line between the clip member and a surface of the spool, the clip member comprising a mounting end portion having the mounting member attached thereto, the mounting end portion having a predefined width in a circumferential direction of the spool, an introduction end portion configured to have a fishing line introduced thereto, and a movement restriction portion disposed between the mounting end portion and the introduction end portion, having a width that is different from the predefined width, and being configured to restrict the fishing line from moving to an introduction section side, the line clip being disposed on the skirt section; and a sheet member disposed between the skirt section and the line clip.

10. The spool of a spinning reel recited in claim 9, wherein the sheet member comprises a rectangular notched portion disposed on the introduction end portion side of the line clip.

11. The spool of a spinning reel recited in claim 10, wherein the rear end part of the sheet member is disposed rearward of the introduction end portion of the clip member.

12. The spool of a spinning reel recited in claim 9, wherein the skirt section has the sheet member disposed in at least one part and has a recess configured to mount the line clip.

13. The spool of a spinning reel recited in claim 12, wherein the recess comprises an opening configured to enable the mounting member of the line clip to pass therethrough.

* * * * *